United States Patent [19]

Barkhau et al.

[11] Patent Number: 4,511,385
[45] Date of Patent: Apr. 16, 1985

[54] FOREHEARTH FOR MOLTEN GLASS AND METHOD OF USING SAME

[75] Inventors: Marvin L. Barkhau, Elmore; Joseph J. Kujawa, Toledo, both of Ohio

[73] Assignee: Owens-Illinois, Inc., Toledo, Ohio

[21] Appl. No.: 542,319

[22] Filed: Oct. 17, 1983

[51] Int. Cl.³ .............................................. C03B 5/04
[52] U.S. Cl. ...................................... 65/135; 65/137; 65/346; 65/356
[58] Field of Search ................... 65/135, 137, 346, 356

[56] References Cited

U.S. PATENT DOCUMENTS

| | | | |
|---|---|---|---|
| 1,893,061 | 1/1933 | Peiler | 65/346 |
| 2,144,973 | 1/1939 | Honiss | 65/137 |
| 4,294,603 | 10/1981 | Winzer et al. | 65/346 |

Primary Examiner—Robert Lindsay
Attorney, Agent, or Firm—Gerald T. Welch; Steve M. McLary; John R. Nelson

[57] ABSTRACT

A centerline cooled forehearth for conditioning molten glass, wherein the sides of the flow channel of the forehearth are provided with external sheets of insulation. The channel is covered by a roof having vertical vents therethrough along the centerline with the usual burner blocks and burners spaced along the sides of the upper edge of the channel. Flue blocks are positioned immediately above the burner blocks, and their lower surfaces extend toward the centerline of the channel a greater extent than the burners, thereby serving as reflectors for the heat from the burners along the side walls of the channel.

5 Claims, 4 Drawing Figures

FOREHEARTH FOR MOLTEN GLASS AND METHOD OF USING SAME

This invention relates to improvements in forehearths of the type which have a rear cooling section, and an outer or forward, so called, temperature conditioning or homogenizing section, the outer end portion of which constitutes the delivery chamber, commonly referred as the spout of the forehearth. In the operation of the forehearth of this type, the temperature of the glass is reduced in the cooling section primarily by cooling wind directed at the roof removing the heat being radiated from the glass while regulating the amount of heat being applied with a view to obtaining, for all the glass leaving the cooling section, an average temperature corresponding to the temperature desired at the outlet or point of removal of glass from the delivery chamber or spout. During the travel of such glass through the outer or homogenizing section of the forehearth, an attempt is made to eliminate temperature gradients between different portions of the glass while preventing or compensating for any further total loss of heat from the glass. This is done by applying a regulated amount of heat to the glass in the homogenizing section, the object being to allow all the glass to even out as to temperature, or uniformly attain the temperature desired.

Since the glass moving from a melting tank, or like source of supply, through the forehearth to the delivery chamber tends to become cooler and to flow more slowly next to the walls of the forehearth channel, it is usual to provide some heating means in an attempt to bring the temperature and rate of flow of the side or edge portions of the stream and the main stream into substantial correspondence. Such means may comprise cooling of the middle section of the glass as by radiation through the top wall of the cooling section of the forehearth while heat loss from the glass at the side or edge portions of the main stream is substantially reduced by the application of heat directly thereto. Most forehearths in use today for providing molten glass to a gob feeder will have a cooling section with heaters therein, and the present invention is particularly directed to an improved cooling section of a forehearth.

An example of the prior art and a good example of the existing forehearths is that shown in U.S. Pat. No. 2,144,973 issued to W. T. Honiss. The cooling section specifically disclosed in this patent shows that the air which is used to cool the roof or crown of the forehearth is fed into manifolds that are built within the confines of the upper forehearth brickwork structure and exhausts out the center thereof. Likewise the position of the introduction of the air to the forehearth is above the burners, but has generally the same position relative to the distance from the sides of the forehearth as do the burner openings. Thus the air inlets are vertically above the burner openings and, as explained in the Honiss patent, the air sweeps across and cools the roof of the forehearth along the center thereof without impingement on the molten glass. By the same token, the burners along each side provide heat along the edges of the forehearth to generally improve the side to side temperature distribution in an attempt to make the glass of a uniform temperature across the width of the forehearth channel. It should also be noted that in the Honiss reference damper blocks 54 and 55 are provided over the vertical openings which extend up through the center of the crown of the forehearth. These openings are relatively large and when compared to the cross-sectional width of the forehearth are nearly ⅓ the width of the inside of the forehearth channel.

SUMMARY OF THE INVENTION

The present invention relates to an improved forehearth cooling section, in which the cooling air is introduced at the sides and directed toward the center line of the forehearth, where an exhaust duct carries the coolant, as well as combustion products, from burners that are arranged along the side wall of the forehearth. The flue blocks through which cooling air is introduced extend from the side of the crown of the forehearth and overlie the forehearth channel sidewall to an extent of a minimum of 3 inches per side up to a maximum of 33% of the forehearth channel width dimension per each side beyond the inside wall of the forehearth channel. Air to the flue block is provided by an external manifold, thus cooling air is confined to the center line only of the forehearth and a greater concentration of heat is obtained and directed by radiation along the sides of the channel.

DETAILED DESCRIPTION OF THE INVENTION

Figure 1:
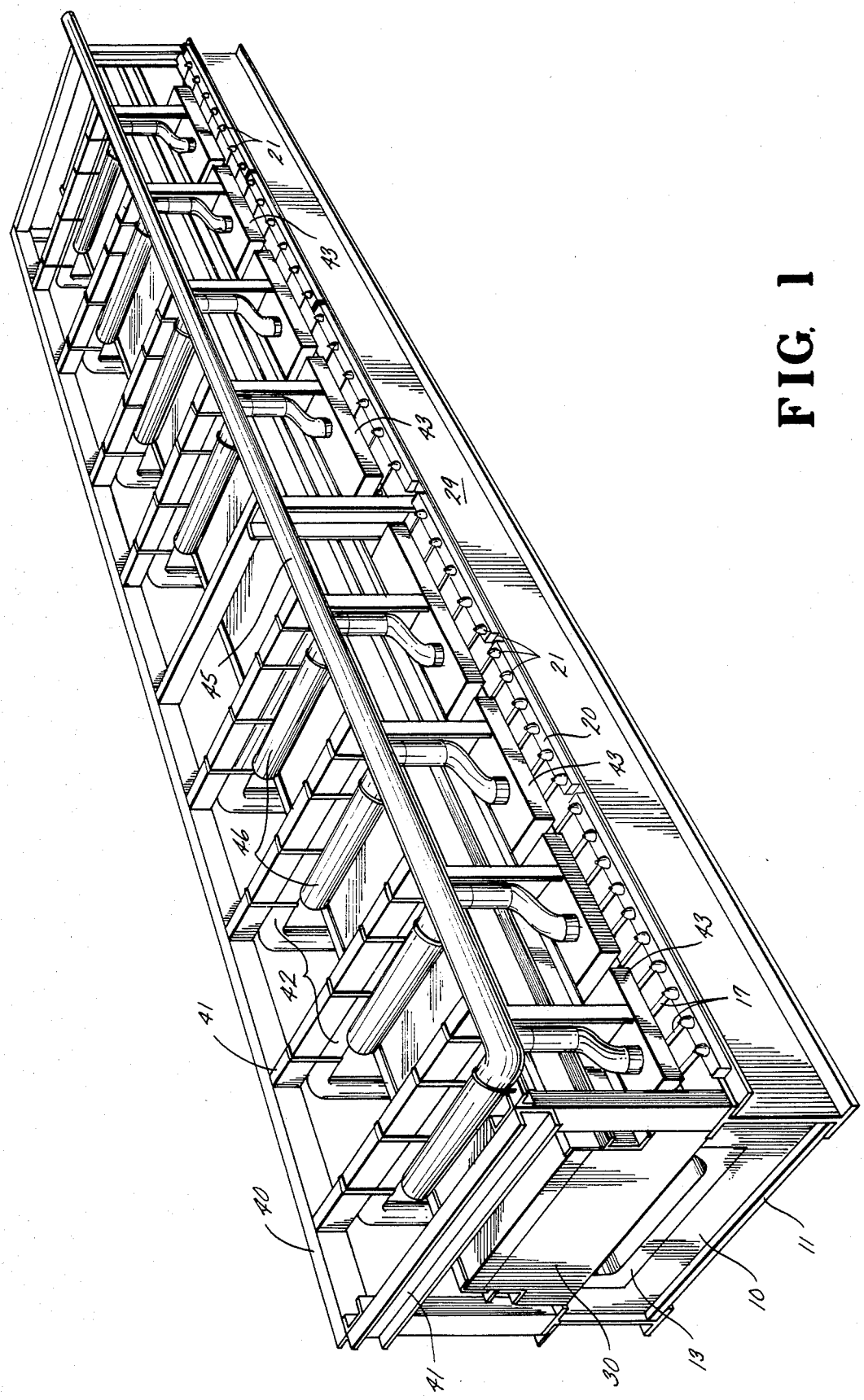
FIG. 1 is a perspective view of a forehearth provided with the glass temperature cooling section or zones according to the invention.
Figure 2:
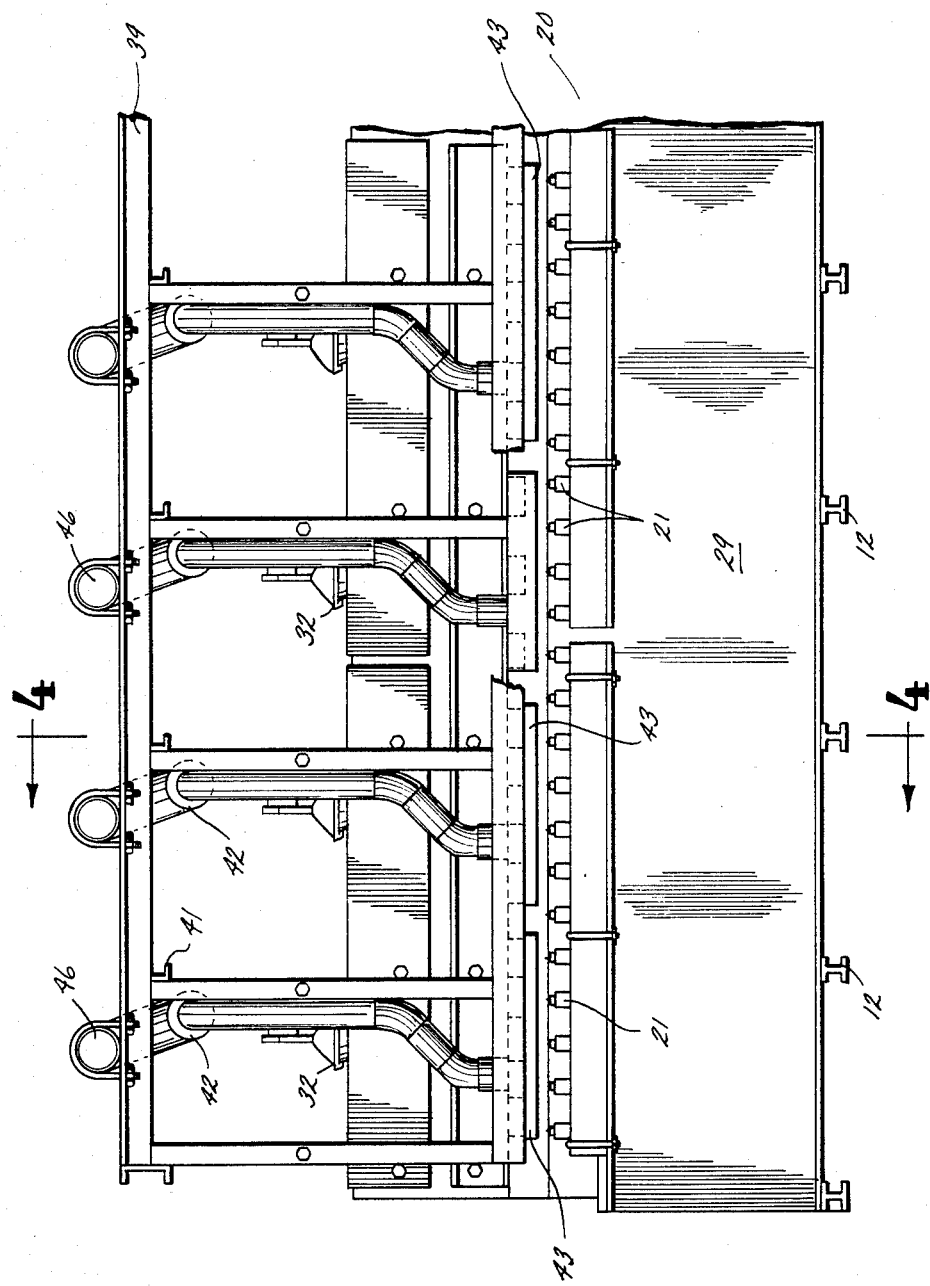
FIG. 2 is a side elevational view of one-half or one zone of the cooling section of the forehearth of FIG. 1, on an enlarged scale.

Particular reference may be had to FIG. 1, where there is shown the full length of a typical cooling section comprised of two or more separated cooling zones of the forehearth of the present invention, and FIG. 2, which is a side view of a portion of FIG. 1. It should be understood that the cut-off portion to the right of FIG. 2 would be identical to that which is shown in FIG. 1, such that FIG. 2 itself actually represents and illustrates only the forward portion or typical zone of the cooling section of the forehearth of the present invention. The left-hand end of FIG. 2 would be that portion of the forehearth which leads to the conditioning section, not shown, and the right-hand end of the forehearth shown in FIG. 1 would be that portion of the forehearth which is in communication with the refiner or melter. The bottom of the forehearth is formed of suitable refractory insulating material such as mullite blocks 10. These blocks 10, while shown as a unitary structure, are actually composed of a plurality of bricks, and the bottom course is laid on a metal superstructure 11, which in turn is supported by several I-beams 12. It should be kept in mind that the bottom of the forehearth is supported at an elevated position relative to the floor of the factory; however, this support of the entire forehearth is not shown in the present drawings.

Figure 3:
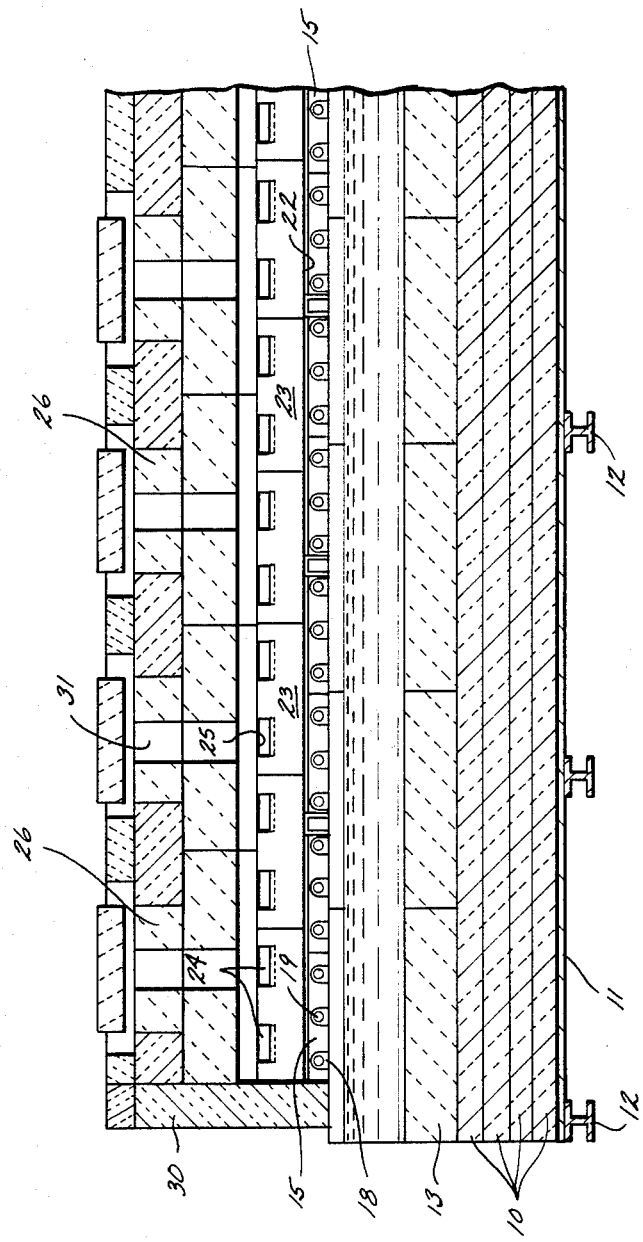
FIG. 3 is a longitudinal, vertical section through the center line of the forehearth of FIG. 2.
Figure 4:
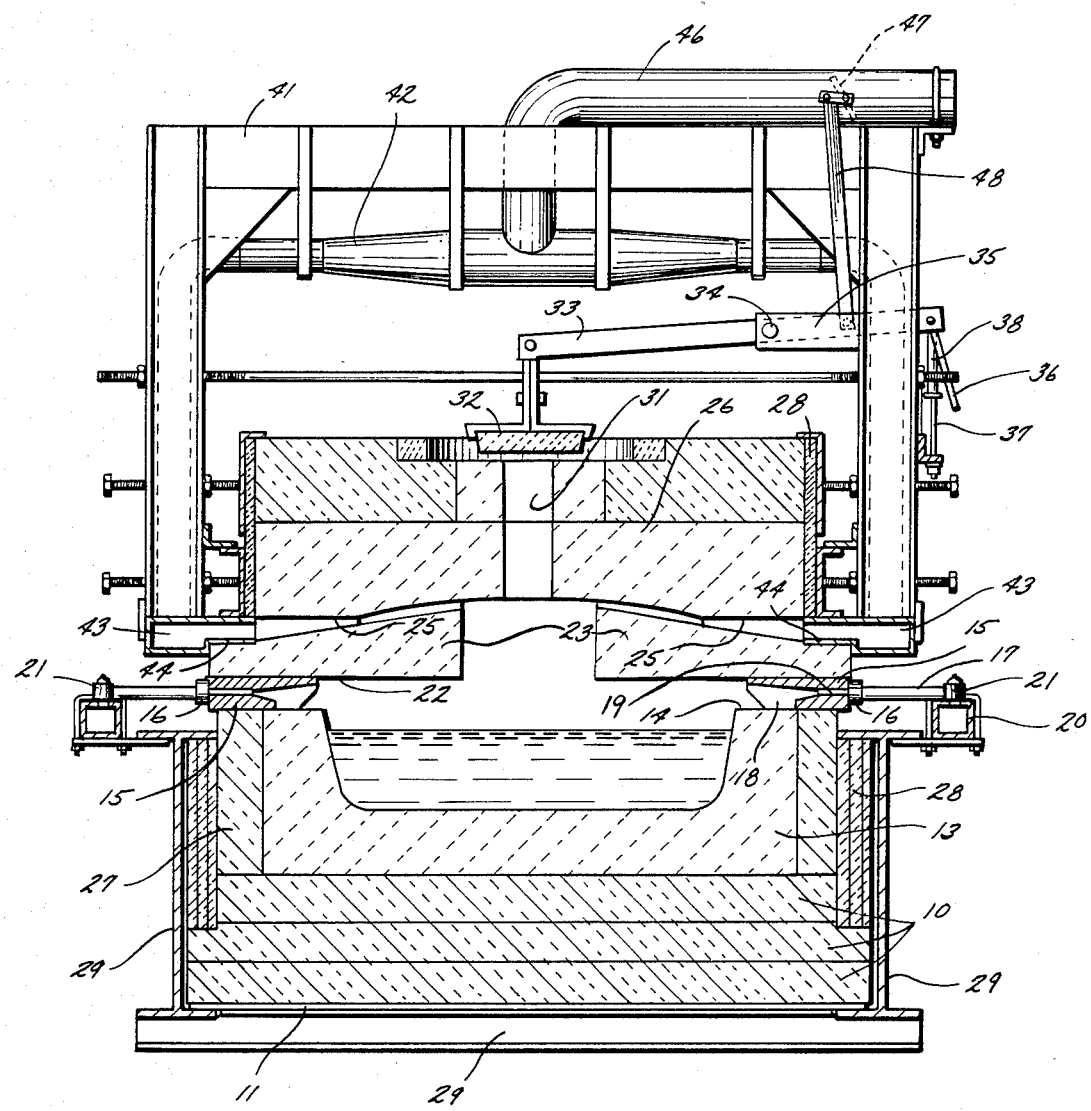
FIG. 4 is a cross-sectional view through the cooling section of the forehearth substantially along the line 4—4 of FIG. 2 and showing the arrangement of the external cooling manifolds and the extended flue blocks.

Above the upper course of the bricks 10 are positioned channel blocks 13, as best seen in FIG. 4. In a typical forehearth these blocks 13 would be approximately 2 feet long as viewed in FIG. 3, with the actual glass channel width formed in the block 13 typically being 26 to 48 inches. The upper edge 14 of the channel block 13 supports a plurality of burner blocks 15. As shown in FIG. 3, each of the burner blocks 15 serves to provide the support for three individual burners 16, which in turn are connected at the rear of the burner block to gas supply nozzles 17. Each of the burner openings is comprised of a tunnel 18 which has a reduced inlet, indicated at 19 in FIG. 4, within which is disposed the tip of the burner 16. The reduced inlet 19 containing the burner tips of the several tunnels 18 at each side of the cooling section are connected with a manifold 20 by the nozzles 17. The manifold 20 is connected to a suitable gas supply pipe supplying fuel to the burners. The manifolds 20 distribute the fuel to valves 21, which may be adjusted and preset for controlling the amount of fuel combustion in the tunnels.

External air is excluded from the outer ends of the firing or combustion tunnels, since mixing of air with the fuel is normally provided prior to its being supplied through the manifold 20. In this fashion, uniformity of the pressure and gaseous composition of the fuel mixture supplied to the several tunnels may be accomplished, and such pressure and gaseous composition may be predetermined and selected so that complete combustion of the mixture supplied to each tunnel will take place therein. This will effect heating of the walls of the inner end portion of each tunnel and the glass adjacent thereto. In addition, the flames exiting from the burner 16 will impinge on the underside 22 of the extended flue blocks 23 and provide radiation heat to the glass surface therebeneath. The extended flue blocks 23 are of such a length as to overlie approximately one-third of the width of the glass channel. The "one-third" distance is considered the maximum distance because if it were greater, the center line cooling area would be inadequate. As best seen in FIGS. 3 and 4, each of the extended flue blocks 23 is provided with a pair of wedge-shaped, in cross-section, cutouts 24 in the top surface thereof. The cutouts 24 form air inlets in conjunction with the underside 25 of the crown block 26. Again with reference to FIG. 4, the channel block 13 is provided along its sides with a refractory brick structure 27 formed of a heat-insulating material such as mullite. In addition, the brick work or structure 27 is covered by three layers of heat-insulating material in the form of sheets 28. The same material, in the form of sheets, is also provided along the outside wall of the crown blocks 26 for the purpose of impeding heat flow away from the side wall.

Along the sides of the forehearth are large I-beams 29 extending the full length thereof. These I-beams actually serve as primary load-bearing members for all of the refractory bricks used to form the elongated forehearth, as best seen in FIG. 1. It is these I-beams 29 and the cross I-beams 12 which generally support the entire forehearth in an elevated position, at least 10 to 12 feet, above the floor of the glass plant. The left end of the forehearth, as best shown in FIGS. 1 and 3, is provided with a single end slab 30. This end slab 30 serves as the member which abuts the conditioning section of the glass delivery system, and also closes off the crown area of the forehearth where the heaters and cooling system are provided, from the intrusion of air into the end of this conditioning section of the forehearth.

As best shown in FIGS. 3 and 4, each crown block 26 is provided with a vertical opening 31 extending therethrough. The openings 31 provide exhaust openings down the center line of the full length of the forehearth. Each opening 31 is provided with a movable closure or damper 32. The dampers or closures 32 are supported and movable by a lever 33, which is shown pivoted adjacent one end at 34 to a fixed support bracket 35. The opposite end of the lever 33 from the closure or damper 32 is connected to an operating arm 36. The arm 36 is connected to a mechanism (not shown) for operating all of the levers 33, which are spaced along the full length of the forehearth, so that each of the dampers 32 may be raised or lowered as desired. Under normal circumstances, these dampers 32 are set at a specific height by the adjustment of a threaded rod 37, which is threaded into an adjusting member 38, which is connected to the extending end of the lever 33. In normal operation, the lever 33 and the damper 32 will be set at a generally fixed position, and the arm or lever 36 is only manipulated during those periods when the forehearth is shut down or when the forehearth is being initially heated and conditioned.

An iron superstructure is provided above the crown of the forehearth and takes the form of a pair of horizontally extending channel iron beams 39 and 40. Cross channel beams 41 are provided, which extend between the two side beams 39 and 40. These channels or beams 41 serve to support air ducts 42. As can best be seen in FIGS. 1 and 2, there is an air duct 42 associated with each of the cross beams 41. The lower ends of the air ducts are in communication with manifolds 43. Each manifold 43 is provided with two or more inwardly-extending portions 44, which are generally rectangular in cross-section, and seat within the ends of the complimentary openings 25 provided in the flue box 23. Thus it can be seen that air from the air duct 42 will split and flow downwardly on both sides of the forehearth upper structure and into the manifolds 43, thence through the flue blocks 23 to sweep across the lower center portion of the crown block underneath surface to the exhaust ports 31. In this manner the center line of the forehearth is maintained cool at whatever preselected or optimum temperature is desired. The volume of the cooling air may be adjusted and the rate of flow thereof is dictated, to a certain extent, by the positioning of the damper 32 relative to the opening 31. Air to the duct 42 is supplied from an air manifold 45, as shown in FIG. 1, which air manifold may extend the full length of the forehearth. A plurality of branch pipes 46 actually connect the main air manifold 45 with the individual air ducts 42. A butterfly valve 47 is provided in each of the branch pipes 46, with its operating arm being connected by an arm 48 to the lever 33 that is connected to and supports the damper or closure 32. At those times when the damper 32 is lowered into closing relationship with respect to the opening 31, the butterfly valve 47 will be closed to shut off the air to the interior of the forehearth. It should also be apparent that upon adjustment of the lever 33 by the member 37, to raise or lower the damper 32, the butterfly valve will also be opened and closed correspondingly, thus providing a system in which both the air supply and the damper opening are coordinated. Thus as can be seen with the structure as set forth above, the forehearth may be operated such that the required amount of regulated cooling air provided will enter the forehearth at the sides without having passed through any of the upper structure of the refractory part of the forehearth. Passing the cooling air through the brick work before entering the forehearth is detrimental from three standpoints: (1) the brick work becomes cooled uncontrollably; (2) the cooling air is heated thus losing some of its efficiency; and (3) allows uncontrolled air entering the forehearth through seams or other possible openings which may appear during service and thereby provide additional uncontrolled cooling. Furthermore, the fact that the underneath of the flue blocks, since they extend out beyond the edge of the glass channel and beyond the burner blocks, will effectively reflect a considerable amount of radiation down onto the glass channel along the edges thereof, which is that portion of the channel of moving glass that typically becomes colder than the center. This, therefore, provides a forehearth cooling section which is better able to provide an homogeneous glass, both from a controlled temperature point of view and from a temperature distribution point of view, since less heat is lost along the edges than in prior art forehearths, and the cooling air is restricted to only the center portion of the underneath surface of the crown to avoid excessive cooling and reheating as has been experienced in forehearths in the past.

The advantages of the forehearth constructed in accordance with the foregoing description will be apparent to those skilled in the art, and a better controlled and more uniform supply of molten glass will be the result of the process disclosed.

We claim:

1. An improved forehearth for conveying molten glass wherein an elongated channel is formed of a plurality of horizontally assembled channel blocks, with a plurality of burner blocks mounted along the upper sides of the channel blocks, a plurality of flue blocks mounted above the burner blocks, a plurality of roof blocks overlying the flue blocks and the forehearth channel, with said roof blocks having vertical openings therethrough at the centerline of the forehearth at spaced intervals therealong, the improvement therein comprising said flue blocks extending from each side of said channel a substantially greater distance than said burner blocks, a plurality of external air manifolds along the outside of said forehearth connected to said flue blocks, each air manifold extending along and spanning several of said flue blocks, and an air duct connected to each air manifold.

2. The forehearth of claim 1 further including sheets of insulation extending along the length of the forehearth on each side thereof and having a height dimension greater than the depth of the forehearth channel.

3. The forehearth of claim 2 further including a sheet of insulation covering the external, vertical side of the roof blocks.

4. The forehearth of claim 1 wherein each air duct includes a horizontal section connected to downwardly extending sections at each side of said forehearth externally thereof, and in communication with said manifolds, and common air supply means connected to said horizontal sections.

5. A method of controlling the temperature of molten glass in an elongated, forehearth channel comprising the steps of, introducing unheated cooling air directly through a plurality of flue blocks that extend over the forehearth channel toward the centerline of the forehearth, firing a combustible mixture at a plurality of points along the forehearth length beneath the flue blocks while confining the flames from the combustion to principally the surface of glass in the forehearth, and exhausting the combustion products and cooling air through the roof of the forehearth over the centerline thereof.

* * * * *